United States Patent
Pyo (10) Patent No.: US 9,575,584 B2
(45) Date of Patent: Feb. 21, 2017

(54) DISPLAY DEVICE WITH INTEGRATED TOUCH SCREEN AND METHOD OF DRIVING THE SAME

(71) Applicant: LG DISPLAY CO., LTD., Seoul (KR)

(72) Inventor: Seung Eun Pyo, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/045,624

(22) Filed: Oct. 3, 2013

(65) Prior Publication Data

US 2014/0176459 A1    Jun. 26, 2014

(30) Foreign Application Priority Data

Dec. 26, 2012 (KR) .......................... 10-2012-0153668

(51) Int. Cl.
*G06F 3/041* (2006.01)
*G06F 3/044* (2006.01)

(52) U.S. Cl.
CPC ............. *G06F 3/0412* (2013.01); *G06F 3/044* (2013.01); *G06F 3/0416* (2013.01)

(58) Field of Classification Search
CPC ............................... G06F 3/0412; G06F 3/044
USPC ............ 345/156, 173, 174; 178/18.01–19.06
See application file for complete search history.

(56) References Cited

U.S. PATENT DOCUMENTS

| | | | |
|---|---|---|---|
| 5,949,391 A * | 9/1999 | Saishu et al. ................... | 345/50 |
| 6,396,469 B1 * | 5/2002 | Miwa ................... | G09G 3/3666 345/100 |
| 6,590,553 B1 * | 7/2003 | Kimura et al. ................. | 345/92 |
| 7,893,901 B2 * | 2/2011 | Kang ................... | G09G 3/3648 345/87 |
| 8,730,224 B2 * | 5/2014 | Lee et al. ...................... | 345/211 |
| 2003/0001983 A1 * | 1/2003 | Nose ................... | G09G 3/3406 349/61 |
| 2004/0001054 A1 * | 1/2004 | Nitta ................... | G09G 3/3648 345/204 |
| 2004/0056831 A1 | 3/2004 | Takatori et al. | |
| 2005/0162410 A1 * | 7/2005 | Johnson et al. ............. | 345/174 |
| 2008/0007533 A1 * | 1/2008 | Hotelling ................ | G06F 3/044 345/173 |

(Continued)

FOREIGN PATENT DOCUMENTS

| CN | 1900802 A | 1/2007 |
|---|---|---|
| CN | 101017419 A | 8/2007 |

(Continued)

*Primary Examiner* — Priyank Shah (74) *Attorney, Agent, or Firm* — Birch, Stewart, Kolasch & Birch, LLP (57) ABSTRACT

Discussed is a display device with integrated touch screen including a panel including a plurality of electrodes; a data driver for converting RGB data into a data voltage, and supplying the data voltage to data lines; a gate driver for sequentially supplying a gate-on signal to n-numbered gate lines to apply the data voltage to pixels of the panel when a driving mode of the panel is a display driving mode; and a touch IC for generating a touch scan signal and supplying the touch scan signal to the plurality of electrodes of the panel when a driving mode of the panel is a touch driving mode, wherein the gate driver sequentially supplies the gate-on signal to the gate lines, and then simultaneously supplies the gate-on signal to the gate lines, and the data driver supplies the data voltage of the same level to the data lines.

2 Claims, 6 Drawing Sheets

(56) References Cited

U.S. PATENT DOCUMENTS

| | | | |
|---|---|---|---|
| 2008/0158172 A1* | 7/2008 | Hotelling | G06F 1/3231 345/173 |
| 2008/0165109 A1* | 7/2008 | Joo et al. | 345/98 |
| 2008/0309627 A1* | 12/2008 | Hotelling et al. | 345/173 |
| 2009/0072854 A1* | 3/2009 | Jeon et al. | 324/770 |
| 2009/0273556 A1* | 11/2009 | Shimoshikiryoh | G09G 3/3611 345/99 |
| 2010/0253638 A1 | 10/2010 | Yousefpor et al. | |
| 2012/0162134 A1* | 6/2012 | Chen et al. | 345/174 |
| 2012/0182251 A1* | 7/2012 | Krah | G06F 3/0412 345/174 |
| 2012/0249518 A1* | 10/2012 | Won et al. | 345/213 |
| 2013/0063469 A1* | 3/2013 | Ruckmongathan | G09G 3/342 345/589 |
| 2013/0141348 A1* | 6/2013 | Jamshidi-Roudbari | G06F 3/044 345/173 |
| 2013/0147744 A1* | 6/2013 | Kim et al. | 345/173 |
| 2014/0240279 A1* | 8/2014 | Hwang | G06F 3/044 345/174 |

FOREIGN PATENT DOCUMENTS

| | | |
|---|---|---|
| CN | 101217026 A | 7/2008 |
| CN | 100495129 C | 6/2009 |
| CN | 201590059 U | 9/2010 |
| CN | 102265245 A | 11/2011 |
| CN | 102265245 B | 4/2014 |
| KR | 10-2001-0015406 A | 2/2001 |
| KR | 10-2007-0109109 A | 11/2007 |
| KR | 10-2012-0109217 A | 10/2012 |
| KR | 10-2012-0111674 A | 10/2012 |

\* cited by examiner

DISPLAY DEVICE WITH INTEGRATED TOUCH SCREEN AND METHOD OF DRIVING THE SAME

CROSS REFERENCE TO RELATED APPLICATIONS

This application claims the benefit of the Korean Patent Application No. 10-2012-0153668 filed on Dec. 26, 2012, which is hereby incorporated by reference as if fully set forth herein.

BACKGROUND

Field of the Disclosure

Embodiments of the present invention relate to a display device, and more particularly, to a display device with integrated touch screen.

Discussion of the Related Art

Touch screens are a type of input device that is included in image displaying devices such as Liquid Crystal Displays (LCDs), Field Emission Displays (FEDs), Plasma Display Panel (PDPs), Electroluminescent Displays (ELDs), and Electrophoretic Display (EPDs), and allows a user to input information by pressing or touching a touch sensor of a screen with a finger, a pen or the like while a user looks at the screen of the image displaying device.

Recently, there is an increasing demand for a display device with integrated touch screen of in-cell type in which elements constituting the touch screen are provided inside the display device so as to realize slimness in mobile terminals such as smart phone and tablet PC.

In case of a general in-cell type touch screen, touch data is transmitted to a system once every one vertical sync signal Vsync to define one frame period. Hereinafter, a driving method of a general display device with integrated touch screen of in-cell type will be described with reference to FIG. 1.

Figure 1:
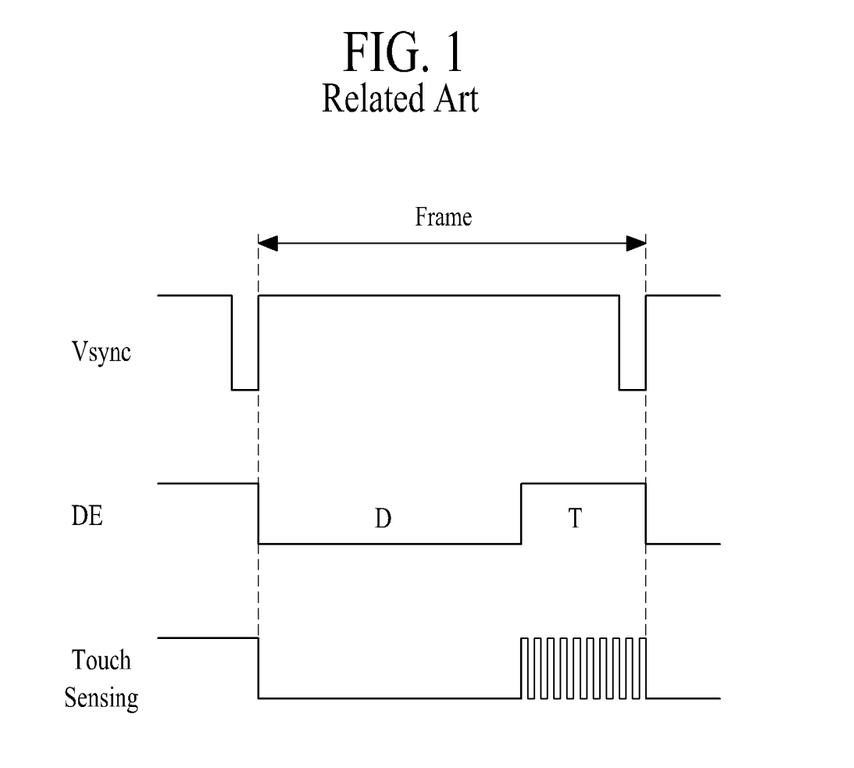
FIG. 1 is a timing diagram illustrating signals of display time and touch time during one frame in a general display device with integrated touch screen.

FIG. 1 is a timing diagram illustrating signals of display time and touch time during one frame in a general display device with integrated touch screen.

In case of a general display device with integrated self-capacitive touch screen of an in-cell type, as shown in FIG. 1, display time (D) and touch time (T) are time-divisionally driven according to a data enable DE signal during one frame based on one vertical sync signal.

If using both a display pixel and a touch sensor, a capacitance is affected by a touch sensing for a specific gray level of display, whereby display video content is directly shown in a touch.

For example, a gray level of display data generates an initial capacitance value in a panel regardless of touch, and the capacitance value may exceed a capacitance variation in touch input.

Figure 2:
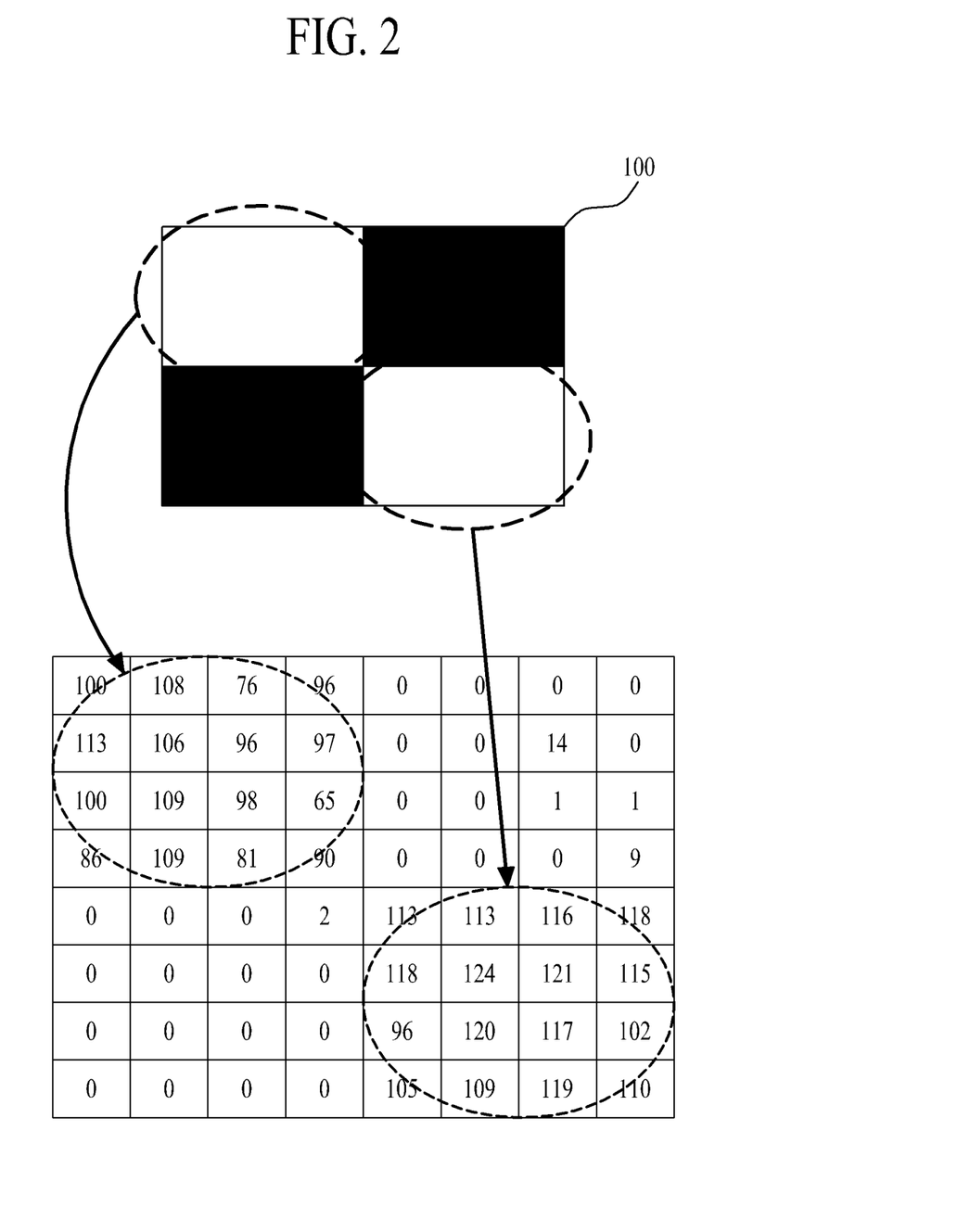
FIG. 2 illustrates values of touch data measured with respect to gray level data of a panel in a general display device with integrated touch screen.

FIG. 2 illustrates values of touch data measured with respect to gray level data of a panel in a general display device with integrated touch screen.

As shown in FIG. 2, on the assumption that a panel 100 is divided into four parts, that is, the panel 100 is classified into black screen and white screen, when white level data is outputted to a display screen, an initial capacitance value is within a range of 60~125 regardless of touch in touch sensing. Especially, although not shown, an entire screen is changed from the black screen to the white screen, the initial capacitance value is increased up to 90~260.

This initial capacitance value exceeds the range of 0~120, that is, the change range of touch data value in the touch input, whereby touch sensitivity may be lowered by the initial capacitance value of the panel 100, and ghost noise may generate. In other words, if data which is inputted to the panel 100 at a moment when the screen is changed from display time to touch time is the white level data, a touch sensing accuracy of the panel 100 may be deteriorated.

SUMMARY

Accordingly, embodiments of the present invention are directed to a display device with integrated touch screen and a method of driving the same that substantially obviate one or more problems due to limitations and disadvantages of the related art.

An aspect of embodiments of the present invention is directed to provide a display device with integrated touch screen, which overcomes a limit of touch sensing performance by a specific gray level of display, and a method of driving the same.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a display device with integrated touch screen that may include a panel including a plurality of electrodes; a data driver for converting RGB data inputted from a timing controller into a data voltage, and supplying the data voltage to data lines; a gate driver for sequentially supplying a gate-on signal to first to nth gate lines so as to apply the data voltage to pixels of the panel when a driving mode of the panel is a display driving mode; and a touch IC for generating a touch scan signal and supplying the touch scan signal to the plurality of electrodes of the panel when a driving mode of the panel is a touch driving mode, wherein the gate driver sequentially supplies the gate-on signal to the first to nth gate lines, and then simultaneously supplies the gate-on signal to the first to nth gate lines, and the data driver supplies the data voltage of the same level to the data lines.

In another aspect of an embodiment of the present invention, there is provided a display device with integrated touch screen that may include a panel including a plurality of electrodes; a data driver for converting RGB data inputted from a timing controller into a data voltage, and supplying the data voltage to data lines; a gate driver for sequentially supplying a gate-on signal to first to nth gate lines so as to apply the data voltage to pixels of the panel when a driving mode of the panel is a display driving mode; and a touch IC for generating a touch scan signal and supplying the touch scan signal to the plurality of electrodes of the panel when a driving mode of the panel is a touch driving mode, wherein the gate driver sequentially supplies the gate-on signal to the first to nth gate lines, divides the gate lines into at least two groups, and then separately supplies the gate-on signal by group, and the data driver supplies the data voltage of the same level to the data lines.

In another aspect of an embodiment of the present invention, there is provided a method of driving a display device with integrated touch screen comprising a panel including a plurality of electrodes, a data driver for supplying a data voltage to data lines, a gate driver for supplying a gate-on signal to first to nth gate lines, and a touch IC for applying a touch scan signal to the panel, that may include converting RGB data into the data voltage, and supplying the data voltage to the data lines; when a driving mode of the panel is a display driving mode, sequentially supplying the gate-on signal to first to nth gate lines so as to apply the data voltage to pixels of the panel, simultaneously supplying the gate-on signal to the first to nth gate lines, and supplying the data voltage of the same level to the data lines; and, when a driving mode of the panel is a touch driving mode, generating the touch scan signal and applying the touch scan signal to the plurality of electrodes of the panel.

In another aspect of an embodiment of the present invention, there is provided a method of driving a display device with integrated touch screen comprising a panel including a plurality of electrodes, a data driver for supplying a data voltage to data lines, a gate driver for supplying a gate-on signal to first to nth gate lines, and a touch IC for applying a touch scan signal to the panel, that may include converting RGB data into the data voltage, and supplying the data voltage to the data lines; when a driving mode of the panel is a display driving mode, sequentially supplying the gate-on signal to first to nth gate lines so as to apply the data voltage to pixels of the panel, dividing the gate lines into at least two groups, and separately supplying the gate-on signal by group; and, when a driving mode of the panel is a touch driving mode, generating the touch scan signal, and applying the touch scan signal to the plurality of electrodes of the panel.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, embodiments of the present invention will be described in detail with reference to the accompanying drawings.

Figure 3:
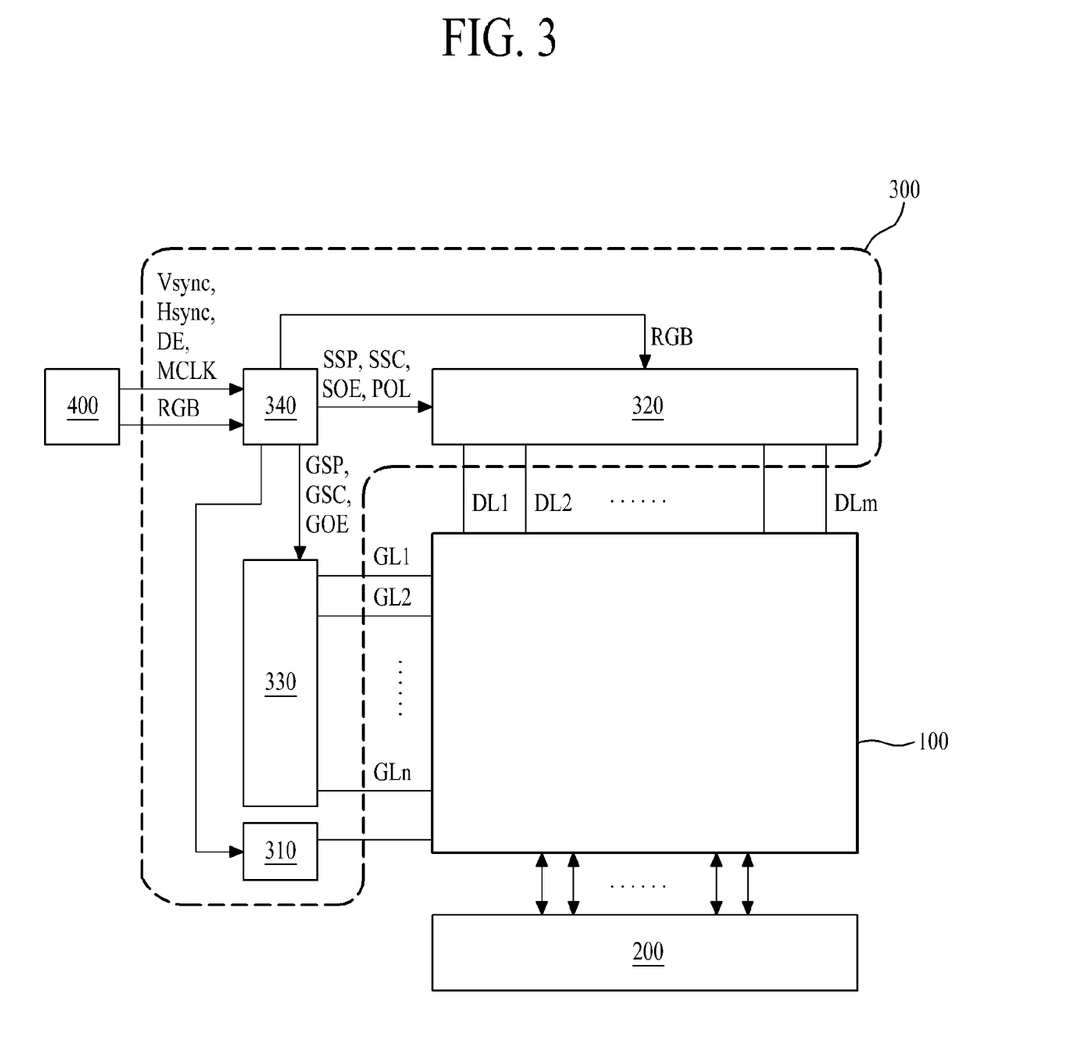
FIG. 3 illustrates a display device with integrated touch screen according to one embodiment of the present invention.

FIG. 3 illustrates a display device with integrated touch screen according to one embodiment of the present invention.

As shown in FIG. 3, the display device with integrated touch screen according to one embodiment of the present invention may include a panel 100, a touch IC 200, a display driver IC 300, and a host system 400.

A touch screen (not shown) is provided inside the panel 100. The touch screen senses a user's touch location. Especially, the touch screen applied to the present invention is an in-cell type touch screen of a self-capacitive type which is time-divisionally driven in display driving and touch driving modes.

The panel 100 may be configured with lower and upper glass substrates, and a liquid crystal layer formed between the two glass substrates. In this case, a plurality of gate lines, a plurality of data lines, and a plurality of thin film transistors (TFT) are formed on the lower substrate of the panel 100. In this case, the gate and data lines cross each other, to thereby define a plurality of pixels in a matrix configuration. Also, each thin film transistor is formed adjacent to a crossing region of the gate and data lines.

Although not shown, the panel 100 may include a plurality of electrodes, and a plurality of lines.

If applying a common voltage for the display driving of the panel 100, the plurality of electrodes may operate as a common electrode, wherein the electrode, together with a pixel electrode formed in each pixel, drives liquid crystal. Meanwhile, if applying a touch scan signal for the touch sensing, the plurality of electrodes may operate as a touch electrode for sensing the touch.

The plurality of lines may be provided to connect the plurality of electrodes with the touch IC 200.

The touch IC 200 may include a touch scan signal generator which generates the touch scan signal to be supplied to the plurality of electrodes of the panel 100 so as to sense the touch, and a touch sensor which senses the user's touch location by sensing a capacitance variation received from the plurality of electrodes of the panel 100.

For example, if the driving mode of the panel 100 is the touch driving mode, the touch IC 200 applies the touch scan signal to the plurality of electrodes, and senses the user's touch location through the capacitance variation received from the plurality of electrodes of the panel 100.

As shown in FIG. 3, the display driver IC 300 may include a common voltage generator 310, a data driver 320, a gate driver 330, and a timing controller 340.

In this case, the common voltage generator 310 generates the common voltage, and applies the generated common voltage to the plurality of electrodes of the panel 100. For example, if the driving mode of the panel 100 is the display driving mode, the plurality of electrodes receive the common voltage, whereby the plurality of electrodes operate as the common electrode for the display driving mode.

Then, the data driver 320 converts RGB data, which is inputted from the timing controller 340 thereto, into a data voltage. The data voltage, which is outputted from the data driver 320, is supplied to data lines DL1 to DLm.

In other words, the data driver 320 sequentially generates sampling signals by shifting a source start pulse SSP, which is received from the timing controller 340, according to a source shift clock SSC. The data driver 320 latches pixel data (RGB, video data), which is inputted according to the source shift clock SSC, according to the sampling signal, converts the latched pixel data into a data signal, and then supplies the data signal to the data lines in units of horizontal line in response to a source output enable SOE signal. The data signal may include the data voltage.

To this end, the data driver 320 may include a data sampling unit, a latch unit, a digital-to-analog converter, and an output buffer.

Then, the gate driver 330 sequentially supplies a gate-on signal to a plurality of gate lines GL1 to GLn so as to apply the data voltage to the pixel of the panel 100, selects the pixel of the panel 100 to which the data voltage is inputted, charges the pixels of the panel 100 with the data voltage which is inputted from the data driver 320 during a high logic period of a horizontal sync signal Hsync in response to the gate signal, and maintains the data voltage during a low logic period of the horizontal sync signal Hsync.

In other words, the gate driver 330 generates the gate signal with gate-on voltage Von by shifting a gate start pulse GSP, which is received from the timing controller 340, according to a gate shift clock GSC, sequentially supplies the gate signal with gate-on voltage to the gate lines GL1 to GLn. The gate driver 330 supplies a gate-off voltage Voff to the gate lines GL1 to GLn during the remaining period which is not supplied with the gate signal with the gate-on voltage Von. In this case, the gate signal may include a gate scan signal.

Meanwhile, the gate driver 330 applied to the present invention may be separately provided from the panel 100. That is, the gate driver 330 may be configured in such a way that the gate driver 330 may be electrically connected with the panel 100 in various methods. However, the gate driver 330 may be configured in a gate-in panel GIP method, that is, the gate driver 330 may be provided inside the panel 100. In this case, a gate control signal for controlling the gate driver 330 may be a start signal VST, and a gate clock GCLK.

Especially, the gate driver 330 of the display device with integrated touch screen according to one embodiment of the present invention may sequentially supply the gate-on signal to the first to nth gate lines GL1 to GLn, and then simultaneously supply the gate-on signal to the first to nth gate lines GL1 to GLn; and the data driver 330 may supply the data voltage of the same level to the data lines DL1 to DLm.

In other words, after the gate-on signal is sequentially supplied to the n-numbered gate lines GL1 to GLn so as to apply the data voltage to the pixels of the panel 100, the pixel to be supplied with the data voltage is selected, and is then charged with the data voltage which is supplied from the data driver 320, to thereby perform the display driving of the pixels. Thereafter, the gate-on signal is simultaneously supplied to the n-numbered gate lines GL1 to GLn, and then all the pixels are charged and applied with the data voltage of the same level supplied from the data driver 320. In this case, the data voltage of the same level may be the data voltage of black level.

After sequentially scanning all the gate lines during the display driving time of the panel 100, all the gate lines are simultaneously scanned so that the data voltage of the same level is applied to the pixels. Thus, final display data before the touch driving time is maintained as the data voltage of the same level, whereby the touch driving time is less influenced by an initial capacitance of the panel 100 of the display time, to thereby reduce an influence of noise in the touch sensing time. Especially, as mentioned above, when the final data is maintained as the data of black level, it is possible to minimize initial capacitance, and thus to obtain high touch sensitivity.

The timing controller 340 generates control signals which enable to apply the common voltage generated in the common voltage generator 310 to the panel 100, or to apply the touch scan signal generated in the touch IC 200 to the panel 100, according to the driving mode of the panel 100.

Moreover, the timing controller 340 receives timing signals such as vertical sync signal Vsync, horizontal sync signal Hsync, data enable DE signal and main clock MCLK, which are inputted from the host system 400, and then generates the control signals GCS and DCS for controlling an operation timing of the gate driver 330 and the data driver 320. Also, the timing controller 340 re-aligns the RGB data inputted from the host system 400, and outputs the re-aligned RGB data to the data driver 320.

Herein, the vertical sync signal Vsync is a signal for defining one frame period. Thus, one cycle of the vertical sync signal Vsync is set to one frame period. Also, the horizontal sync signal Hsync is a signal for defining one horizontal period which is required for recording data in the pixels of one line in a pixel array of the panel 100. Accordingly, one cycle of the horizontal sync signal Hsync may be set to one horizontal period, and one horizontal period may be obtained by dividing one frame period by the number of lines of the panel 100. The data enable DE signal is the signal for defining a period when effective data is inputted, and one cycle is set to one horizontal period in the same manner as the horizontal sync signal Hsync. The main clock MCLK is synchronized with a bit of the RGB data.

The host system 400 of the display device with integrated touch screen according to the embodiment of the present invention provides the timing signals such as vertical sync signal Vsync, horizontal sync signal Hsync, data enable DE signal and main clock CLK, and the RGB data to the timing controller 340.

An operation of the display device with integrated touch screen according to one embodiment of the present invention will be described in brief with reference to FIG. 4.

Figure 4:
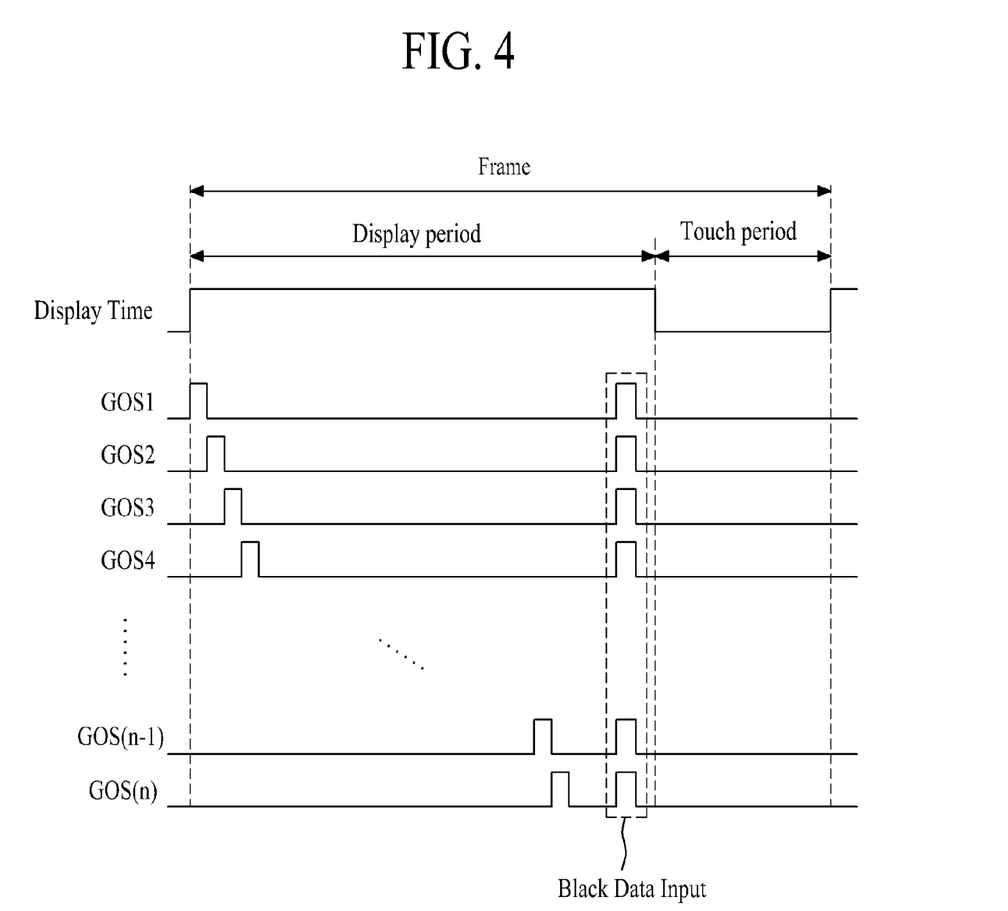
FIG. 4 is a timing diagram illustrating gate-on signals of display time and a signal of touch time during one frame in a display device with integrated touch screen according to one embodiment of the present invention.

FIG. 4 is a timing diagram illustrating gate-on signals of display time and a signal of touch time during one frame in a display device with integrated touch screen according to one embodiment of the present invention.

In the display device with integrated touch screen according to one embodiment of the present invention, as shown in FIG. 4, one frame is divided into display period and touch period, wherein the gate-on signal GOS is applied to the n-numbered gate lines GL1 to GLn during the display period.

In other words, the gate-on signal GOS is sequentially applied once to all the gate lines during one frame.

After the panel 100 is driven in the display driving mode during one frame by sequentially applying the gate-on signal GOS once to the gate lines GL1 to GLn for the display period, the gate-on signal GOS is simultaneously applied to the gate lines GL1 to GLn before the touch period, whereby the data voltage is simultaneously applied to the pixels of the panel 100. In this case, the applied data voltage may be the data voltage of the same level, especially, the data voltage of black level.

After all the gate lines are sequentially scanned during the display driving time of the panel 100, all the gate lines are scanned at the same time, whereby the data voltage of black level is applied to the pixels. Thus, final display data before the touch driving time is maintained as the data voltage of the black level, whereby the touch driving time is less influenced by the initial capacitance of the panel 100 of the display time, to thereby reduce the influence of noise in the touch sensing time.

Hereinafter, an operation of the display device with integrated touch screen according to various embodiments of the present invention will be briefly described with reference to FIGS. 5 and 6. In the display device with integrated touch screen according to various embodiments of the present invention, two groups are provided, and the gate-on signal is supplied by each group, but it is limited to the two groups. For example, three or more groups may be provided if needed.

The other elements except the data driver and gate driver are mentioned already, that is, a detailed explanation for the other elements will be omitted.

Figure 5:
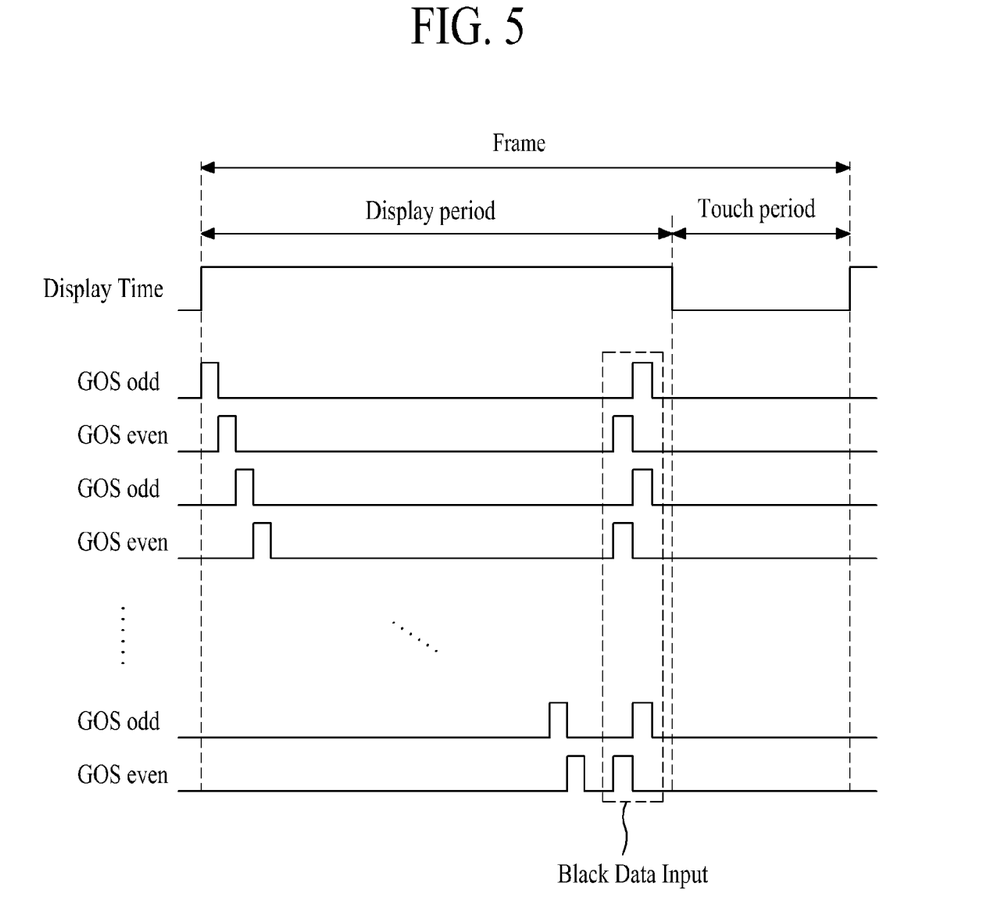
FIG. 5 is a timing diagram illustrating gate-on signals of display time and a signal of touch time during one frame in a display device with integrated touch screen according to another embodiment of the present invention.
Figure 6:
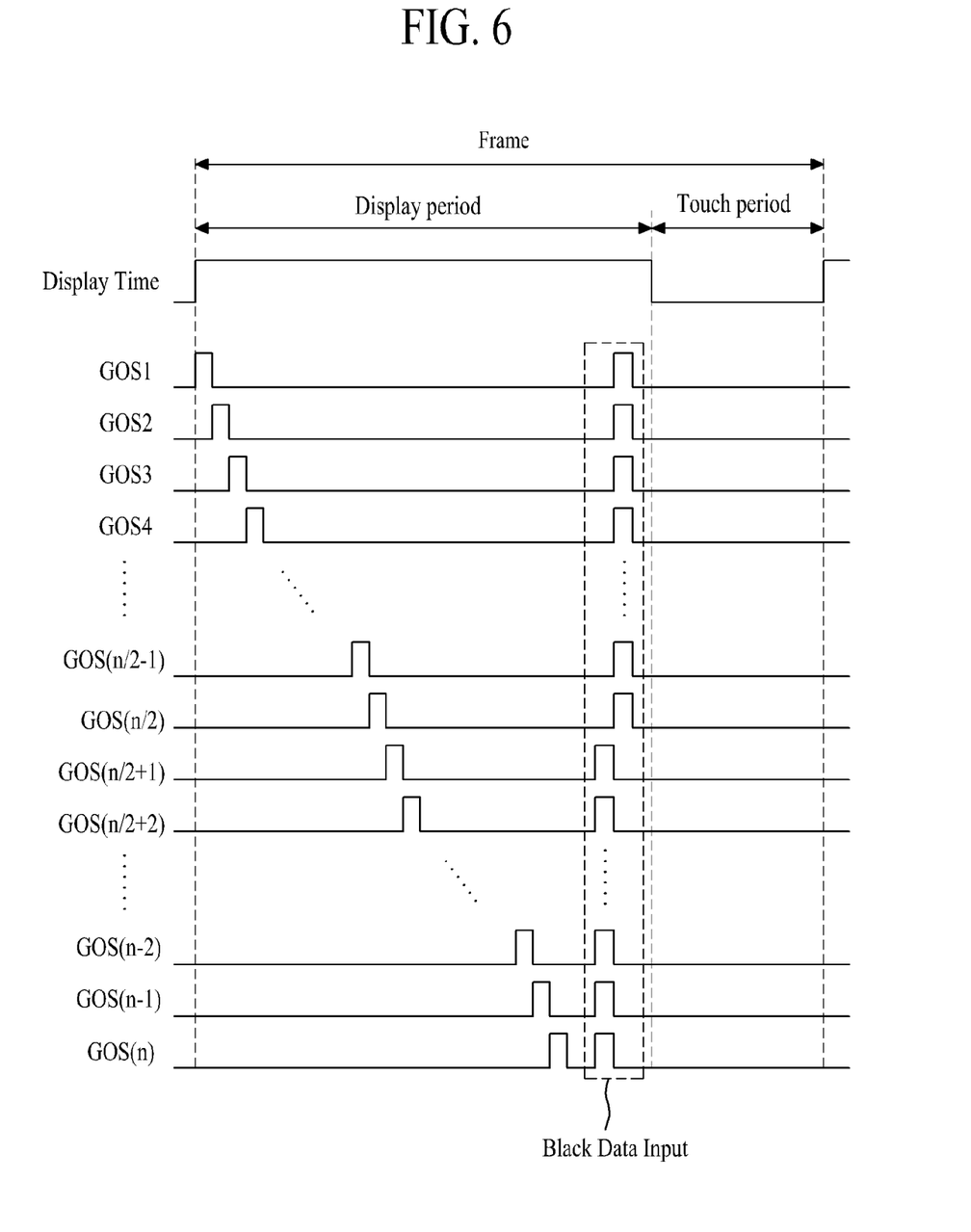
FIG. 6 is a timing diagram illustrating gate-on signals of display time and a signal of touch time during one frame in a display device with integrated touch screen according to another embodiment of the present invention.

FIG. 5 is a timing diagram illustrating gate-on signals of display time and a signal of touch time during one frame in a display device with integrated touch screen according to another embodiment of the present invention. FIG. 6 is a timing diagram illustrating gate-on signal of display time and a signal of touch time during one frame in a display device with integrated touch screen according to another embodiment of the present invention.

In FIG. 5, the gate lines are divided into first and second groups, wherein the first group comprises the odd numbered gate lines, and the second group comprises the even numbered gate lines. In FIG. 6, the gate lines are divided into first and second groups, wherein the first group comprises a first gate line to an (n/2)th gate line, and the second group comprises an (n/2+1)th gate line to an nth gate line.

In the display device with integrated touch screen according to various embodiments of the present invention, one frame is divided into the display period and the touch period. During the display period, the gate-on signal GOS is applied to each of the first to nth gate lines GL1 to GLn.

That is, after the gate-on signal is sequentially supplied to the first to nth gate lines GL1 to GLn, the gate lines are divided into at least two groups, the gate-on signal is supplied by group, and the data driver 320 supplies the data voltage of the same level to the data lines.

In other words, after the gate-on signal is sequentially supplied to the first to nth gate lines GL1 to GLn so as to apply the data voltage to the pixels of the panel 100, the pixel of the panel 100 to be supplied with the data voltage is selected, and is then charged with the data voltage which is inputted from the data driver 320, to thereby perform the display driving. Thereafter, the gate lines GL1 to GLn are divided into at least two groups, and the gate-on signal is supplied by each group, and the pixels for each of the groups are charged and applied with the data voltage of the same level which is inputted from the data driver 320. In this case, the data voltage of the same level may be the data voltage of the black level.

Especially, the gate-on signal may be simultaneously supplied to the respective groups, or the gate-on signal may be separately supplied with time intervals by each of groups. That is, the data voltage of the same level may be applied by simultaneously supplying the gate-on signal to the first and second groups; the gate-on signal may be separately supplied with time intervals to each of the first group comprising the odd numbered gate lines, and the second group comprising the even numbered gate lines; or the gate-on signal may be separately supplied with time intervals to each of the first group comprising the first to (n/2)th gate lines, and the second group comprising the (n/2+1)th to nth gate lines.

After sequentially scanning all the gate lines during the display driving time of the panel 100, the gate lines for each of the two groups are scanned by group so that the data voltage of the same level is applied to the pixels according to the group of the gate lines. Thus, final display data before the touch driving time is maintained as the data voltage of the same level, whereby the touch driving time is less influenced by the initial capacitance of the panel 100 of the display time, to thereby reduce an influence of noise in the touch sensing time. Especially, as mentioned above, when the final data is maintained as the data of black level, it is possible to minimize initial capacitance, and thus to obtain high touch sensitivity.

Hereinafter, various driving methods of the above display device with integrated touch screen according to the present invention will be described with reference to FIGS. 3 to 6.

The driving method of the display device with integrated touch screen according to one embodiment of the present invention, as shown in FIG. 3, wherein the display device comprises the panel 100 including the plurality of electrodes, the data driver 320 for supplying the data voltage to the data lines, the gate driver 340 for supplying the gate-on signal to the gate lines GL1 to GLn, and the touch IC 200 for applying the touch scan signal to the panel 100, comprises converting RGB data into the data voltage, and supplying the data voltage to the data lines.

Then, when the driving mode of the panel 100 is the display driving mode, the gate-on signal is sequentially supplied to the first to nth gate lines GL1 to GLn so as to apply the data voltage to the pixels of the panel 100, and then the gate-on signal is simultaneously supplied to the first to nth gate lines GL1 to GLn, whereby the data voltage of the same level is supplied to the data lines. In this case, the data voltage of the same level may be the data voltage of the black level.

After sequentially scanning all the gate lines during the display driving time of the panel 100, all the gate lines are simultaneously scanned so that the data voltage of the same level is applied to the pixels. Thus, final display data before the touch driving time is maintained as the data voltage of the same level, whereby the touch driving time is less influenced by the initial capacitance of the panel 100 of the display time, to thereby reduce the influence of noise in the touch sensing time. Especially, as mentioned above, when the final data is maintained as the data of black level, it is possible to minimize initial capacitance, and thus to obtain high touch sensitivity.

Then, when the driving mode of the panel 100 is the touch driving mode, the touch scan signal is generated, and is then applied to the plurality of electrodes of the panel 100.

The driving method of the display device with integrated touch screen according to the embodiment of the present invention, as shown in FIG. 3, wherein the display device comprises the panel 100 including the plurality of electrodes, the data driver 320 for supplying the data voltage to the data lines, the gate driver 340 for supplying the gate-on signal to the gate lines GL1 to GLn, and the touch IC 200 for applying the touch scan signal to the panel 100, comprises converting RGB data into the data voltage, and supplying the data voltage to the data lines.

Then, when the driving mode of the panel 100 is the display driving mode, the gate-on signal is sequentially supplied to the first to nth gate lines GL1 to GLn so as to apply the data voltage to the pixels of the panel 100, the gate lines are divided into at least two groups, the gate-on signal is supplied by group, and the data voltage of the same level is supplied to the data lines. In this case, the data voltage of the same level may be the data voltage of black level.

For example, the process of dividing the first to nth gate lines into at least two groups, and supplying the gate-on signal by group may simultaneously supplying the gate-on signal to the respective groups, or separately supplying the gate-on signal with time intervals to the respective group.

That is, the data voltage of the same level may be supplied by simultaneously supplying the gate-on signal to the first group and second group; by separately supplying the gate-on signal to the first group comprising the odd numbered gate lines, and the second group comprising the even numbered gate lines; or by separately supplying the gate-on signal to the first group comprising the first to (n/2)th gate lines, and the second group comprising the (n/2+1)th to nth gate lines.

Then, when the driving mode of the panel 100 is the touch driving mode, the touch scan signal is generated, and is then applied to the plurality of electrodes of the panel 100.

According to the embodiments of the present invention, it is possible to prevent the influence of display data on the touch sensing, thereby obtaining the touch sensing performance without the influence from the display.

Moreover, the display noise, which has an influence on the touch sensing, is removed so that it is possible to remove other noise as well as the display noise, thereby obtaining accuracy of touch.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A display device with integrated in-cell type touch screen, comprising:
   a panel including a plurality of in-cell type electrodes and transistors;
   a data driver for converting first display data and black level display data inputted from a timing controller into a first data voltage and a second data voltage of a same level, respectively, and supplying the first data voltage and the second data voltage to data lines;
   a gate driver for sequentially supplying a gate-on signal to first to nth gate lines so as to apply the first data voltage to pixels of the panel when a driving mode of the panel is a display driving mode;
   a common voltage generator for applying a common voltage to the plurality of in-cell type electrodes when the driving mode of the panel is the display driving mode; and
   a touch IC for generating a touch scan signal and supplying the touch scan signal to all of the plurality of in-cell type electrodes of the panel and sensing a capacitance variation from all of the plurality of in-cell type electrodes of the panel when a driving mode of the panel is a touch driving mode, wherein the display driving mode and the touch driving mode occur in a same frame period,
   wherein the gate driver sequentially supplies the gate-on signal to the first to nth gate lines when the first display data is input from the timing controller, divides the gate lines into at least two groups, and then separately supplies the gate-on signal having a gate high voltage for turning on the transistors of the panel by group when the black level display data is input from the timing controller to minimize initial capacitance of the plurality of in-cell type electrodes of the panel before a start of the touch driving mode during the frame period,
   wherein the data driver supplies the data voltage of the same level to the data lines when the gate-on signal is separately supplied by group,
   wherein the first display data and the black level display data are both input from the timing controller during a same driving mode of the same frame period and each of the first to nth gates lines is supplied with the gate-on signal twice the during the same driving mode of the same frame period,
   wherein the at least two groups include a first group comprising the first to (n/2)th gate lines and a second group comprising the (n/2+1)th to nth gate lines, and
   wherein the gate-on signal is simultaneously supplied to the first to (n/2)th gate lines when the black level display data is input from the timing controller, and the gate-on signal is simultaneously supplied to the (n/2+1)th to nth gate lines when the black level display data is input from the timing controller and at a different time than when the gate-on signal simultaneously supplied to the first to (n/2)th gate lines.

2. A method of driving a display device with integrated in-cell type touch screen comprising a panel including a plurality of in-cell type electrodes and transistors, a data driver for supplying a first data voltage and a second data voltage to data lines, a gate driver for supplying a gate-on signal to first to nth gate lines, and a touch IC for applying a touch scan signal to all of the plurality of in-cell type electrodes and sensing a capacitance variation from the plurality of in-cell type electrodes, the method comprising:
   converting first display data and black level display data into the first data voltage and the second data voltage of a same level, respectively, and supplying the first data voltage and the second data voltage to the data lines,
   wherein the panel includes a display driving mode and a touch driving mode, and the display driving mode and the touch driving mode occur in a same frame period,
   wherein a common voltage generator applies a common voltage to the plurality of in-cell type electrodes when the driving mode of the panel is the display driving mode;
   when a driving mode of the panel is a display driving mode, sequentially supplying the gate-on signal to first to nth gate lines so as to apply the first data voltage to pixels of the panel when the first display data is input from a timing controller, dividing the gate lines into at least two groups, and then simultaneously supplying the gate-on signal having a gate high voltage for turning on the transistors of the panel by group before a start of the touch driving mode during the frame period, and supplying the data voltage of the same level to the data lines when the gate-on signal is simultaneously supplied to the first to nth gate lines; and
   when a driving mode of the panel is the touch driving mode, generating the touch scan signal and applying the touch scan signal to all of the plurality of in-cell type electrodes of the panel and sensing a capacitance variation from all of the plurality of in-cell type electrodes,
   wherein the data driver supplies the data voltage of the same level to the data lines when the gate-on signal is separately supplied by group,
   wherein the first display data and the black level display data are both input from the timing controller during a same driving mode of the same frame period and each of the first to nth gates lines is supplied with the gate-on signal twice the during the same driving mode of the same frame period, wherein the at least two groups include a first group comprising the first to (n/2)th gate lines and a second group comprising the (n/2+1)th to nth gate lines, and wherein the gate-on signal is simultaneously supplied to the first to (n/2)th gate lines when the black level display data is input from the timing controller, and the gate-on signal is simultaneously supplied to the (n/2+1)th to nth gate lines when the black level display data is input from the timing controller and at a different time than when the gate-on signal simultaneously supplied to the first to (n/2)th gate lines.

\* \* \* \* \*